UNITED STATES PATENT OFFICE.

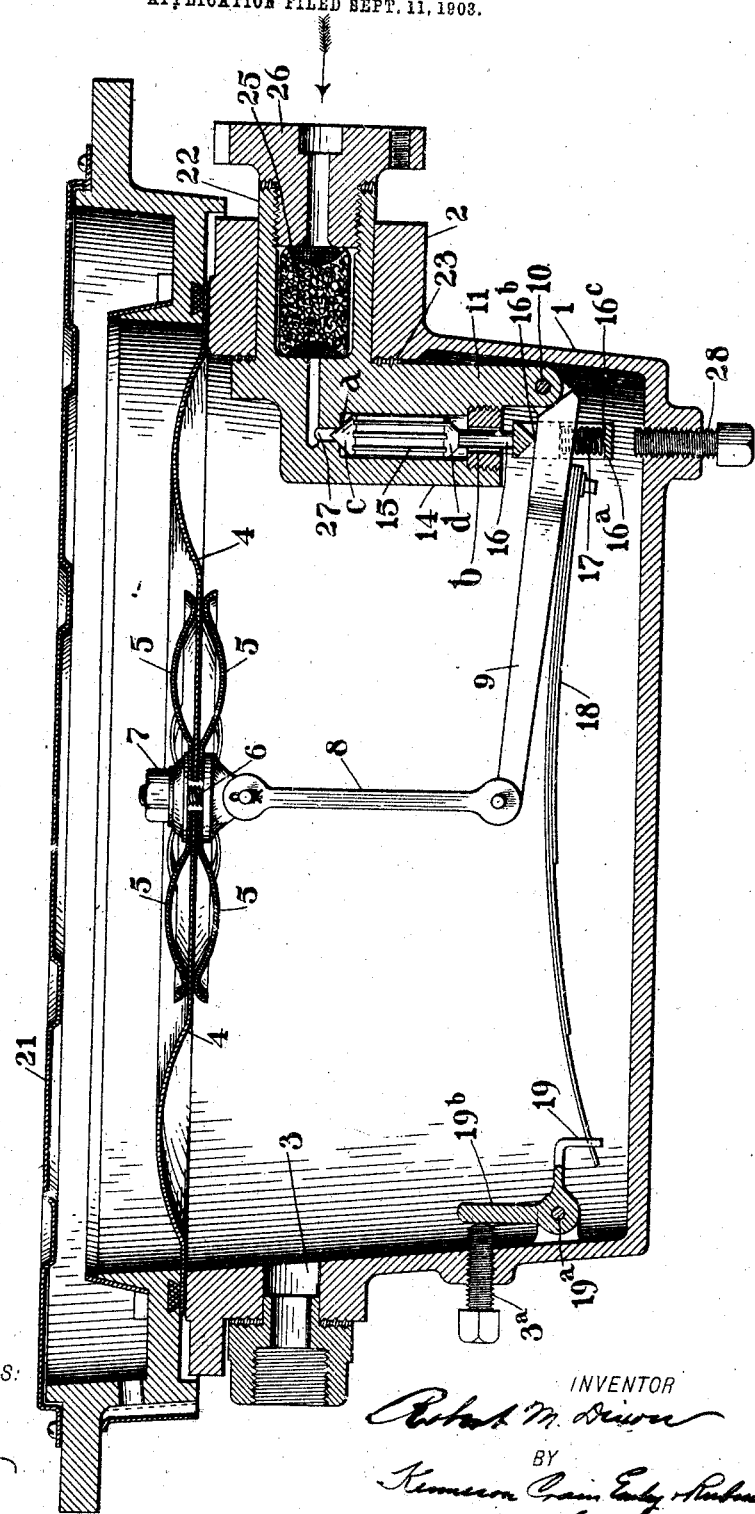

ROBERT M. DIXON, OF EAST ORANGE, NEW JERSEY, ASSIGNOR TO THE SAFETY CAR HEATING & LIGHTING COMPANY, A CORPORATION OF NEW JERSEY.

PRESSURE-REGULATOR.

No. 854,340.   Specification of Letters Patent.   Patented May 21, 1907.

Application filed September 11, 1903. Serial No. 172,733.

*To all whom it may concern:*

Be it known that I, ROBERT M. DIXON, a citizen of the United States, residing at East Orange, in the county of Essex and State of New Jersey, have invented certain new and useful Improvements in Pressure - Regulators, of which the following is a specification.

My invention relates to pressure regulators and has for its object to produce a regulator which will be efficient in action and which will automatically close off the flow of gas in the event of the happening or occurrence of any abnormal condition reducing pressure on the low-pressure side of the regulator such as a break in the pipe or of any contingency.

In the accompanying drawing I have shown a regulator in which one form of my invention is embodied. It will be understood, however, that the regulator may be variously constructed. The regulator shown in the drawing is of the type ordinarily known as the Pintsch type. This regulator finds its principal utility in systems of lighting railway cars with gas.

In this drawing I have shown a transverse sectional view of a regulator.

In the drawing 1 indicates the body casting of the regulator provided with an inlet nipple or passage 2, and an outlet nipple or passage 3. The usual diaphragm 4 is provided, to which diaphragm clamps 5 are secured by the clamp bolts 6 and clamp nuts 7. A suitable link 8 is or may be pivoted at one end to the clamp bolt 6 and at the other end to the main lever 9 which is pivoted at 10 in the bracket 11 and secured to the valve casing 14. This valve casing is bored for the reception of a valve 15, which valve works freely in the casing and is adapted to regulate the flow of gas to the regulator, and also to entirely shut off the flow in case the conditions become abnormal. The valve 15 is or may be carried upon a suitable stem 16, carried by a yoke $16^a$ provided with a suitable knife edge $16^b$ and a spring step $16^c$ for the reception of a spring 17 which bears against the lower face of the main lever 9. A spring 18 is secured near one end of the main lever 9 and at the other end projects into a spring anchor 19 pivoted at $19^a$ to the casing and having an adjustment device $19^b$ adapted to be adjusted by screw $3^a$ passing through the casing 3. The regulator may be provided with the usual cover 21. The valve casing 14 is shown as provided with an extension 22 which passes freely through the inlet nipple 2 and is securely packed by ring packing 23 held in place on the regulator body or casing in any suitable or desired manner. This extension is shown as disposed angularly with respect to the valve casing and is bored or recessed to receive the sieve 25, and screw-threaded to receive a bushing 26 by which the sieve is held in place. The gas entering through the bushing 26 passes through the angular passage 27 of the extension and the valve casing and thence to the valve 15. The valve casing 14 is provided with a plurality of valve seats $a$—$b$. Co-operating with these valve seats are the ends $c$—$d$ of the valve structure 15. These ends $c$—$d$ will for convenience be hereinafter referred to individually as valves, although the entire structure is substantially a unitary structure. The valve $c$ is adapted to the seat $a$ and the valve $d$ is adapted to the seat $b$.

The operation of the construction shown is as follows: When the parts are in their normal positions the pressure of the gas on the regulator diaphragm will cause the valve $c$ to regulate the gas pressure after the manner of the ordinary Pintsch regulator; the gas pressure taking care of its own regulation. Should a pipe break on the low-pressure side, or pressure be otherwise reduced, the tension of the diaphragm upon the lever 9 will be relaxed and the valve structure 15 will descend, bringing the valve $d$ against the seat $b$, cutting off the flow of gas. I have shown a screw 28 tapped into a casing for the purpose of raising the yoke $16^a$ to start the flow of gas should occasion require it.

As many changes could be made in the above construction, and many apparently widely different embodiments of my invention might be made, without departing from the scope thereof, I intend that all matters contained in the above description, or shown in the accompanying drawings, shall be interpreted as illustrative and not in a limiting sense.

Having described my invention, what I claim and desire to secure by Letters Patent is:—

1. In a pressure regulator, in combination, a pressure chamber, a flexible diaphragm forming one wall thereof, inlet and outlet apertures provided in said pressure chamber, a valve chamber supported in said inlet aperture and extending within said pressure chamber, a member provided with a plurality of valves located in said valve casing adapted to be seated upon oppositely disposed seats arranged in said casing, a lever pivoted to said valve casing adapted to operate said valve, a link connecting said lever with said diaphragm, a spring having one of its ends attached to said lever intermediate its length, and means operating upon the opposite end of said spring for adjusting the tension thereof, said spring being adapted to oppose a movement of said diaphragm under the influence of the gas pressure in said chamber.

2. In a pressure regulator, the combination of a chamber, one wall of which is formed by a flexible diaphragm, a gas inlet leading into said chamber, a gas outlet leading therefrom, a valve adapted to be seated upon a plurality of oppositely disposed seats in said gas inlet, connecting means between said valve and said diaphragm whereby said diaphragm under the influence of the gas pressure controls the operation of said valve, resilient means connected with said connecting means adapted to co-act with said diaphragm in the control of said valve, and means extending without said chamber for adjusting the tension of said spring.

ROBERT M. DIXON.

Witnesses:
ELMER E. ALLBER,
S. D. E. MORSE.